(12) United States Patent
Naito et al.

(10) Patent No.: US 6,487,377 B2
(45) Date of Patent: Nov. 26, 2002

(54) RECYCLE INFORMATION SYSTEM AND IMAGE FORMING APPARATUS FOR RECYCLING

(75) Inventors: Yoshikazu Naito, Toyokawa (JP); Takahiro Tsujimoto, Toyokawa (JP); Hiroyuki Yoshikawa, Aichi-Ken (JP); Akinori Kimata, Toyohashi (JP); Katsuhide Sakai, Toyokawa (JP); Shigeo Ogino, Toyokawa (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 09/938,554

(22) Filed: Aug. 27, 2001

(65) Prior Publication Data

US 2002/0028080 A1 Mar. 7, 2002

(30) Foreign Application Priority Data

Sep. 1, 2000 (JP) .......................................... 2000-265133

(51) Int. Cl.⁷ ........................ G03G 15/00; G03G 21/00
(52) U.S. Cl. ............................. 399/12; 399/81; 399/8
(58) Field of Search .............................. 399/8, 10, 12, 399/24, 27, 79, 81, 109

(56) References Cited

U.S. PATENT DOCUMENTS 6,233,409 B1 * 5/2001 Haines et al. ................. 399/10

FOREIGN PATENT DOCUMENTS

| JP | 7-020759 | | 1/1995 | |
|----|----------|---|--------|---|
| JP | 10-216689 | | 8/1998 | |
| JP | 10-24081 | * | 9/1998 | .......... G03G/21/00 |
| JP | 11-024515 | | 1/1999 | |

* cited by examiner

Primary Examiner—Hoang Ngo
(74) Attorney, Agent, or Firm—Morrison & Foerster LLP

(57) ABSTRACT

A recycle information system for recycling reusable parts from machines and equipment such as image forming apparatus, and reutilize the recovered member as a manufacturing material. A recycle information system utilizing a production control computer to manage information on production parts being used or scheduled for use in manufacturing and maintenance services, is linked by a communications line with a control device for machines and equipment scheduled for recycling, monitors information on parts of machines and equipment capable of recycling, and when a machine is recovered from a user, compares production part information stored in the production control computer with recovered part information stored in the recovered device, and acquires information on whether individual parts used in the recovered machine are capable of being recycled, and information on a factory destination address.

20 Claims, 8 Drawing Sheets

Fig. 6

| MODEL CODE: EA350 | | | |
|---|---|---|---|
| ID NO. | PARTS NAMES | RECORD OF PARTS REPLACEMENT | PARTS CODES |
| | | | AT THE TIME OF INITIAL / AT THE TIME OF RECOVERING |

| ID NO. | PARTS NAMES | RECORD OF PARTS REPLACEMENT | AT THE TIME OF INITIAL | AT THE TIME OF RECOVERING |
|---|---|---|---|---|
| L1 | CONTROL PANEL | NOT REPLACED | 1001-1111-01 | 1001-1111-01 |
| L2 | FRONT COVER | NOT REPLACED | 1002-1121-01 | 1002-1121-01 |
| L3 | SIDE COVER | NOT REPLACED | 1004-1125-01 | 1004-1125-01 |
| L4 | SCANNER | REPLACED | 2111-2330-01 | 2111-2332-01 |
| L5 | PHOTOSENSITIVE DRUM | REPLACED | 2401-1151-01 | 2401-1151-02 |
| L6 | CHARGER ROLLER | NOT REPLACED | 2501-1101-01 | 2501-1101-01 |
| L7 | TRANSFER ROLLER | REPLACED | 3801-1131-05 | 3801-1131-12 |
| ----- | | | | |
| Lm | POWER CODE | NOT REPLACED | 9001-1001-11 | 9001-1001-11 |

Fig. 7

| ID NO. | MODEL CODE | PRODUCTION STATUS | PARTS NAMES | PARTS CODE(A) | SUBSTITUTE PARTS CODE(AX) |
|---|---|---|---|---|---|
| K01 | EA320 | FINISHED | CONTROL PANEL | 1001-1001-01 | |
| K02 | EA320 | FINISHED | SCANNER | 2001-1321-01 | 2111-2332-01 |
| ... | | | | | |
| K11 | EA350 | IN PRODUCTION | CONTROL PANEL | 1001-1111-01 | |
| K12 | EA350 | IN PRODUCTION | FRONT COVER | 1002-1121-01 | |
| K13 | EA350 | IN PRODUCTION | SIDE COVER | 1004-1125-01 | |
| K14 | EA350 | IN PRODUCTION | SCANNER | 2111-2332-01 | |
| K15 | EA350 | IN PRODUCTION | PHOTOSENSITIVE DRUM | 2401-1151-02 | 2111-2330-01 |
| K16 | EA350 | IN PRODUCTION | TRANSFER ROLLER | 3801-1131-12 | |
| ... | | | | | |
| K21 | EA370 | IN PRODUCTION | TRANSFER ROLLER | 3801-1135-11 | |
| K22 | EA370 | IN PRODUCTION | PHOTOSENSITIVE DRUM | 3201-1151-01 | 3801-1131-12 |
| ... | | | | | |
| K31 | EA380 | IN PRODUCTION | CHARGER ROLLER | 2501-1101-01 | |
| ... | | | | | |
| Kn | EA400 | IN PRODUCTION | POWER CODE | 9001-1001-15 | |

Fig. 8

| MODEL CODE: EA350 | | | RECYCLE TAG | |
|---|---|---|---|---|
| ID NO. | PARTS NAMES | PARTS CODES AT THE TIME OF RECOVERING | RECYCLE YES/NO | APPLICABLE MODEL CODE |
| L1 | CONTROL PANEL | 1001-1111-01 | NON RECYCLABLE | |
| L2 | FRONT COVER | 1002-1121-01 | NON RECYCLABLE | |
| L3 | SIDE COVER | 1004-1125-01 | NON RECYCLABLE | |
| L4 | SCANNER | 2111-2332-01 | RECYCLE-SUBSTITUTE OK | EA350, EA320 |
| L5 | PHOTOSENSITIVE DRUM | 2401-1151-02 | RECYCLABLE | EA350 |
| L6 | CHARGER ROLLER | 2501-1101-01 | RECYCLABLE | EA380 |
| L7 | TRANSFER ROLLER | 3801-1131-12 | RECYCLE-SUBSTITUTE OK | EA350, EA370 |
| ----- | | | | |
| Lm | POWER CODE | 9001-1001-11 | NON RECYCLABLE | |

RECYCLE INFORMATION SYSTEM AND IMAGE FORMING APPARATUS FOR RECYCLING

This application is based on the patent application No. 2000-265133 filed in Japan, the contents of which are hereby incorporated by reference.

BACKGROUND OF THE INVENTION

1. Field of the Invention

The present invention relates to a recycle information system for machines and equipment and relates in particular to a recycle information system for image forming apparatus such as copiers, printers and facsimile machines, etc. and image forming apparatus for recycling.

2. Description of Prior Art

Interest in protecting the environment has heightened in recent years and the recycling of component parts constituting machines including image forming apparatus such as copiers, printers and facsimiles is under evaluation. The product life span of image forming apparatus is determined by the number of years of service or the frequency of usage, however even if the apparatus overall has reached the end of its product life, many parts of the apparatus have not reached the end of their product life. Therefore, the overall apparatus can be recovered and dismantled, sorted into parts for reuse and parts for discarding, and after undergoing the required inspection, the usable parts can then be recycled. A recycle system for toner cartridges for example, is already in operation.

A task indicator system for plants recycling office equipment such as copiers has already been proposed (see Japanese Laid-Open Patent Application No. Hei 10-216689) that predicts the service life of recoverable parts, and specifies recycling tasks for each recovered part of office equipment per manufacturing period and component part based on a database of usage records of office equipment on the market, and a characteristic information database holding information on the particular characteristics of parts used in the recovered office equipment.

In this system, when the machine number of a recovered parts of office equipment is input, whether or not the parts listed for that piece of office equipment can be reused is designated, and a processing method for reusing those parts are designated, so that the recycle operation can proceed quickly and accurately.

However in the above described task indicator system for the recycling plant, after the machine was recovered, in order to dismantle and attempt to reuse parts of the machine, the entire machine including components that were not reusable had to be shipped to the recycling plant, causing the problem of a large burden when recovering a machine for recycling.

Further, in order to supply reusable parts recovered at the recycling plant, to the production line at the manufacturing plant, the recycling plant had to be located adjacent to the manufacturing plant. A location adjacent to the manufacturing plant was satisfactory when all the recovered parts are used at the manufacturing plant, however, when some of the recovered parts had to be used at a manufacturing plant in a remote location, a shipping fee was added to the expenses creating the problem of higher costs.

SUMMARY OF THE INVENTION

In view of the problems with the related art, it is an object of the present invention to provide a recycle information system for machines and equipment to compare information relating to the production member with information relating to the recovered parts and determine if recycling of the recovered parts is possible or not in the recycling system that recovers reusable parts from used machines and equipment and reuses there covered parts as production members.

Another object of the present invention is to provide a recycle information system having machines and equipment linked by a communications line with a control station for monitoring information on production parts in use or scheduled for use in manufacture and in maintenance servicing; and the information on reusable parts in machines and equipment scheduled for recycling can be controlled from the machines and equipment side.

Still another object of the present invention is to provide machines or equipment for receiving information on production parts in use or scheduled for use in manufacture and in maintenance servicing from the control station linked by way of the communications line, and for determining whether or not the individual parts used in the machines or equipment scheduled for recycling is reusable.

Other objects of the invention will become apparent to one skilled in the related art after reading the detailed description of the invention and referring to the accompanying drawings.

BRIEF DESCRIPTION OF THE DRAWINGS

FIG. 6 is a list showing a typical recording format for recovered part information of the parts comprising the copier.

FIG. 7 is a list showing a typical recording format for manufacturing plant production part information.

FIG. 8 is a typical recording format for recycle information.

DESCRIPTION OF THE PREFERRED EMBODIMENTS

Figure 1:
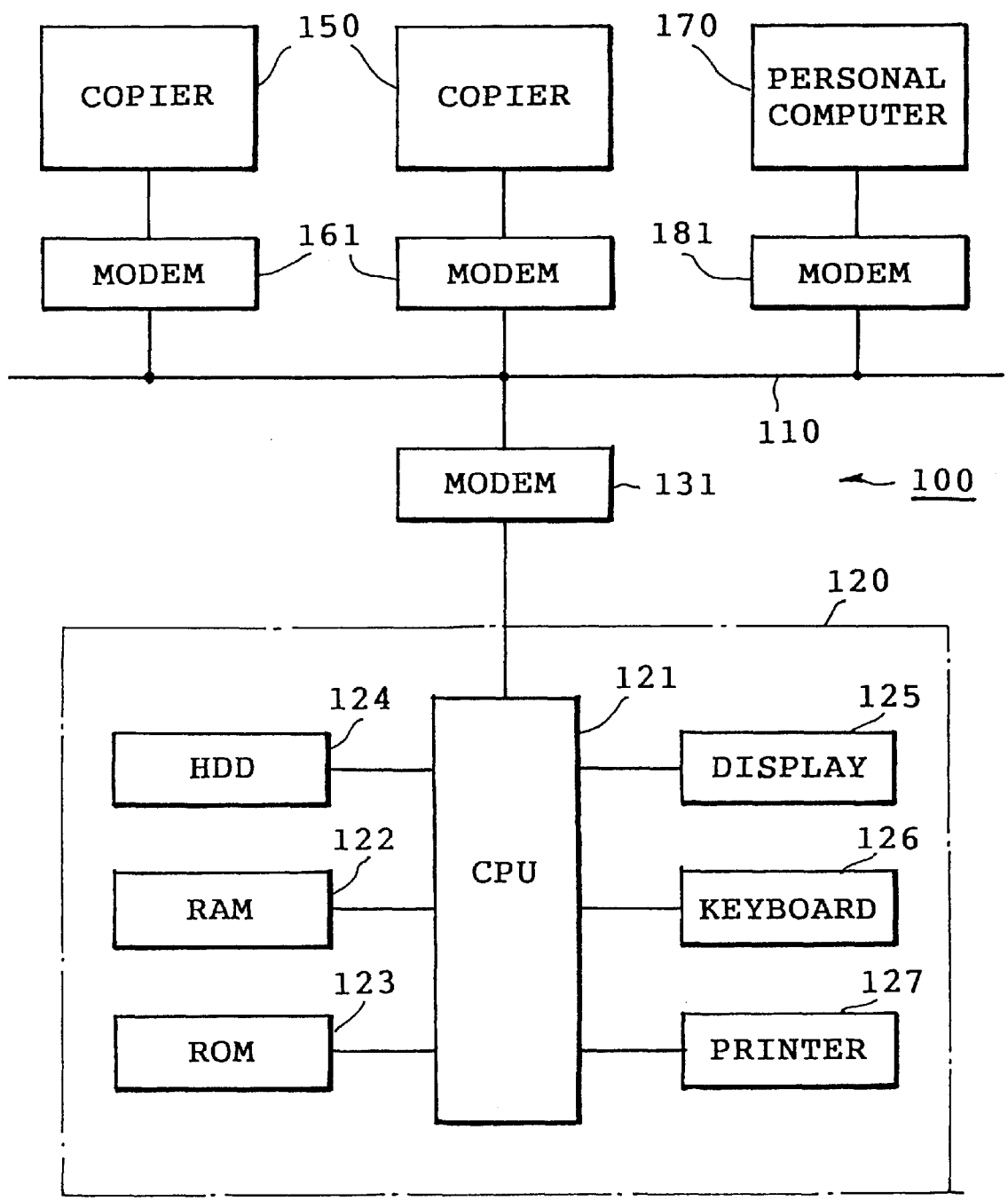
FIG. 1 is a block diagram showing the recycle information system of the embodiment of the invention.

The embodiments of the present invention are hereafter described. The structure of a recycle information system 100 of the embodiment of the present invention is described while referring to FIG. 1.

A manufacturing plant production control computer 120 is connected to a communication line 110 by a modem 131, and a plurality of commercially available copiers 150 for future recycling are also connected to the communication line 110 by way of the modem 161. A plurality of personal computers 170 are also connected by way of the modem 181 to the communication line 110, and are capable of accessing external information. A conventional public communications line may be used as the communication line 110. The copiers 150 are here assumed to be digital type copiers but are not limited to the digital type.

Needless to say, facsimiles and printers intended for future recycling may also be connected to the communication line 110 and comprise the recycle information system, however in the description here, a plurality of copiers for recycling are connected to the communication line 110.

The computer utilized as the production control computer 120 is a known computer composed of a CPU 121 and a RAM 122, a ROM 123, a hard disk 124, a display 125, a keyboard 126 and a printer 127 connected to the input/output ports of the CPU 121.

Information on parts used in a plurality of copier models during manufacture at the plant is stored in the hard disk 124 and constantly updated. In the following description, the information on the parts used in the copiers during production is referred to here as production part information and is appended with a code letter A for reference.

The portion of the copier 150 used as image forming apparatus is already known in the conventional art so a description is omitted here, however as a copier for recycling, the copier 150 comprises the following portions not provided in conventional copiers.

Figure 2:
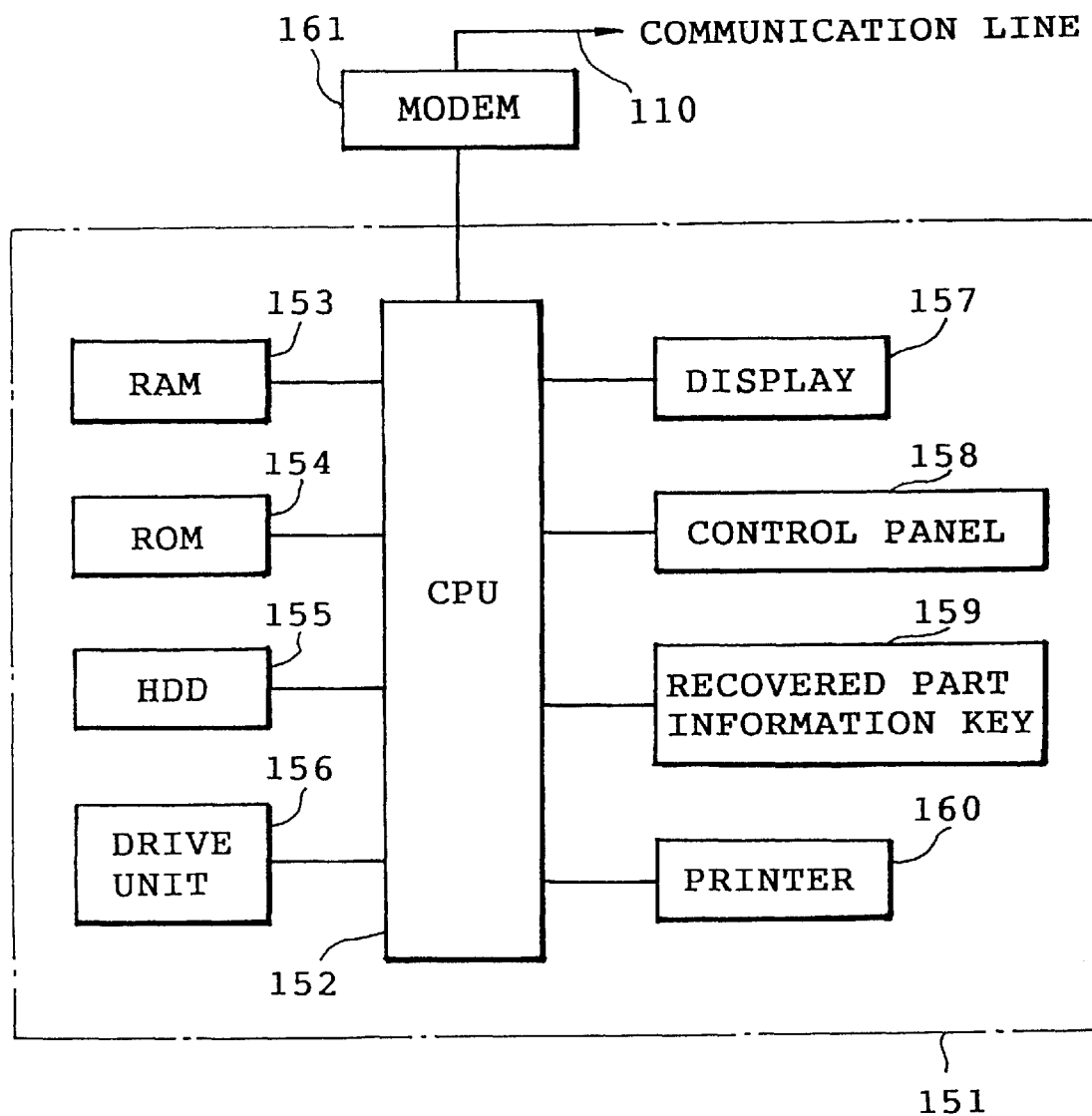
FIG. 2 is a block diagram showing the structure of the control circuit of the copier for recycling.

FIG. 2 is a block diagram for describing the structure of the control circuit 151 of the copier 150 for recycling. The control circuit 151 is used to control the normal image forming operation, and is composed of the CPU 152, and the RAM 153, ROM 154, drive unit 156 for various type of image forming mechanisms, a display 157 and a control panel 158, connected to the input/output ports of the CPU 152.

Besides the above, in terms of a unique structure of a copier for recycling, a hard disk 155, a recovered part information key 159, and a printer 160 are connected to the input/output ports of the CPU 152. A configuration allowing connection to the output terminal of portable computers may also be provided.

Information on all types of parts of the copier 150, such as part codes showing initially manufactured parts, the fact that part was replaced or not, and if a part was replaced with a substitute part, replaced part code is stored in the hard disk 155. In the following description, information on each of the parts comprising the copier 150, is referred to as recovered part information and appended with a code letter B for reference.

A recovered part information key 159 is a key for requesting the transmission of production part information from the production control computer 120. In other words, though explained in detail later on, when the copier is recovered from the user, recycle information is made for determining whether the parts of the copier is recyclable or not, and the recovered part information B compared with the production part information A. These functions are performed by using the recovered part information key 159, and since these functions are not used in normal copying operation, the recovered part information key 159 is installed inside the copier to prevent the user from operating by mistake, and may be configured only to be operated by the serviceman as needed.

The printer 160 utilizes the print function of the copier 150 and so is shown as printer 160 on FIG. 2 to designate those print functions. If the copier 150 is an analog copier not provided with a character generator, a separate printer may be connected as a printer 160.

The CPU 152 is connected to the communications line by way of the modem 161 and configured to allow data communication to exchange all kinds of part information with the production control computer 120 of the manufacturing plant.

Control of the comparison processing of the various part information implemented on the CPU 152 of the copier 150 is described next while referring to the flow chart of FIG. 3.

A check is first made as to whether the recovered part information key 159 was operated or not (step P11), and if not operated, the operation returns to the main routine, and shifts to executing normal copier control functions.

When determined in step P11 that the recovered part information key 159 was operated, the recovered part information B of copier 150 is read from the hard disk 155 (step P12). A transmit request signal for production part information A is sent to the production control computer 120 of the manufacturing plant by way of the communication line (step P13).

When the production control computer 120 of the manufacturing plant receives the transmit request signal, the production part information A used in various copier models in current production is sent from the hard disk 124 to the copier 150 by way of the communication line.

The CPU 152 of the copier 150 awaits completion of receiving the production part information A sent from the production control computer 120 (step P14). When finished receiving the production part information A, a comparison of the recovered part information B of copier 150 is made with the production part information A (step P15), the results of the comparison (see FIG. 8) are printed out (step P16), the comparison processing completed and the process returns to the main routine.

Figure 3:
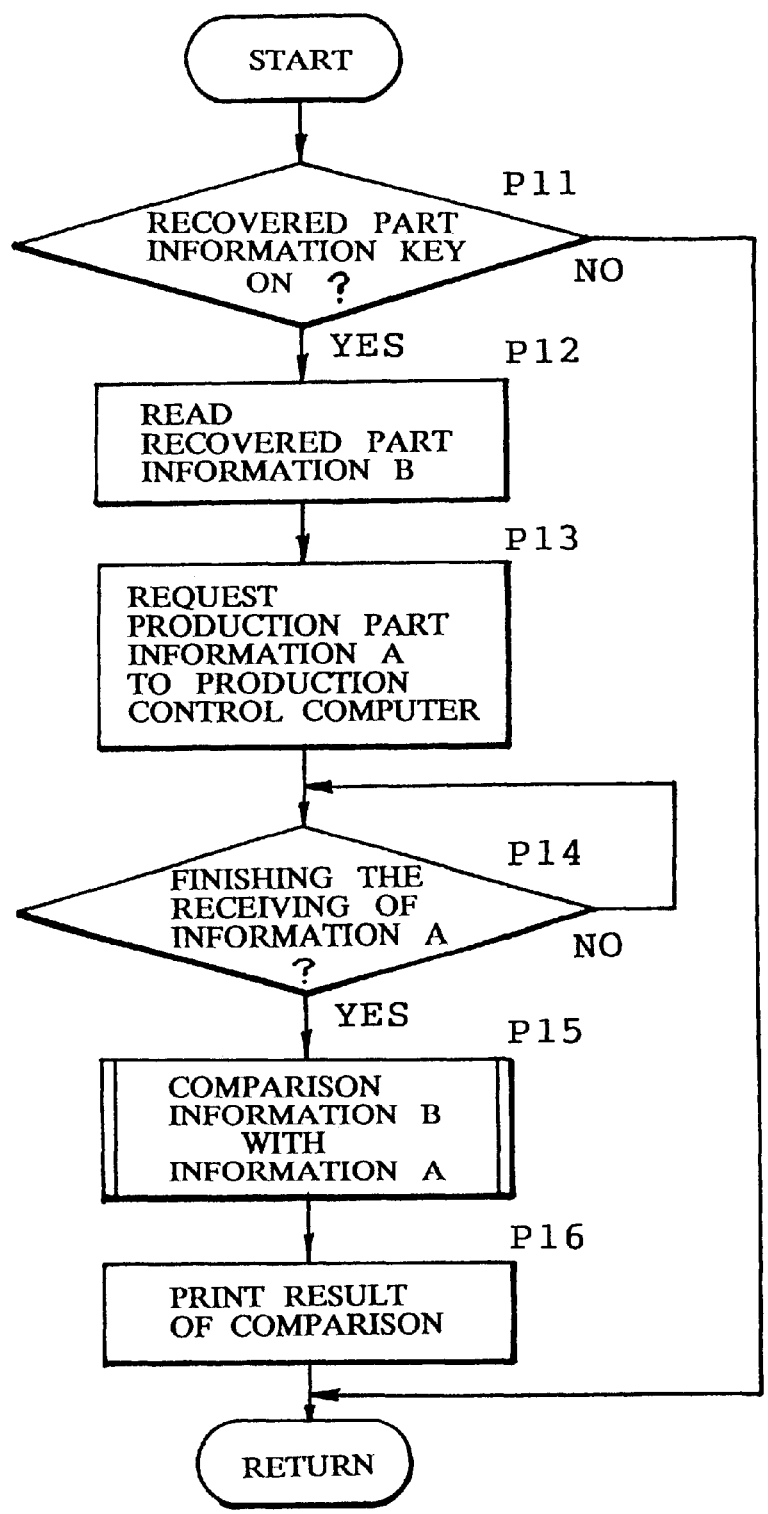
FIG. 3 is a flowchart showing the process for comparing part information implemented on the copier for recycling.
Figure 4:
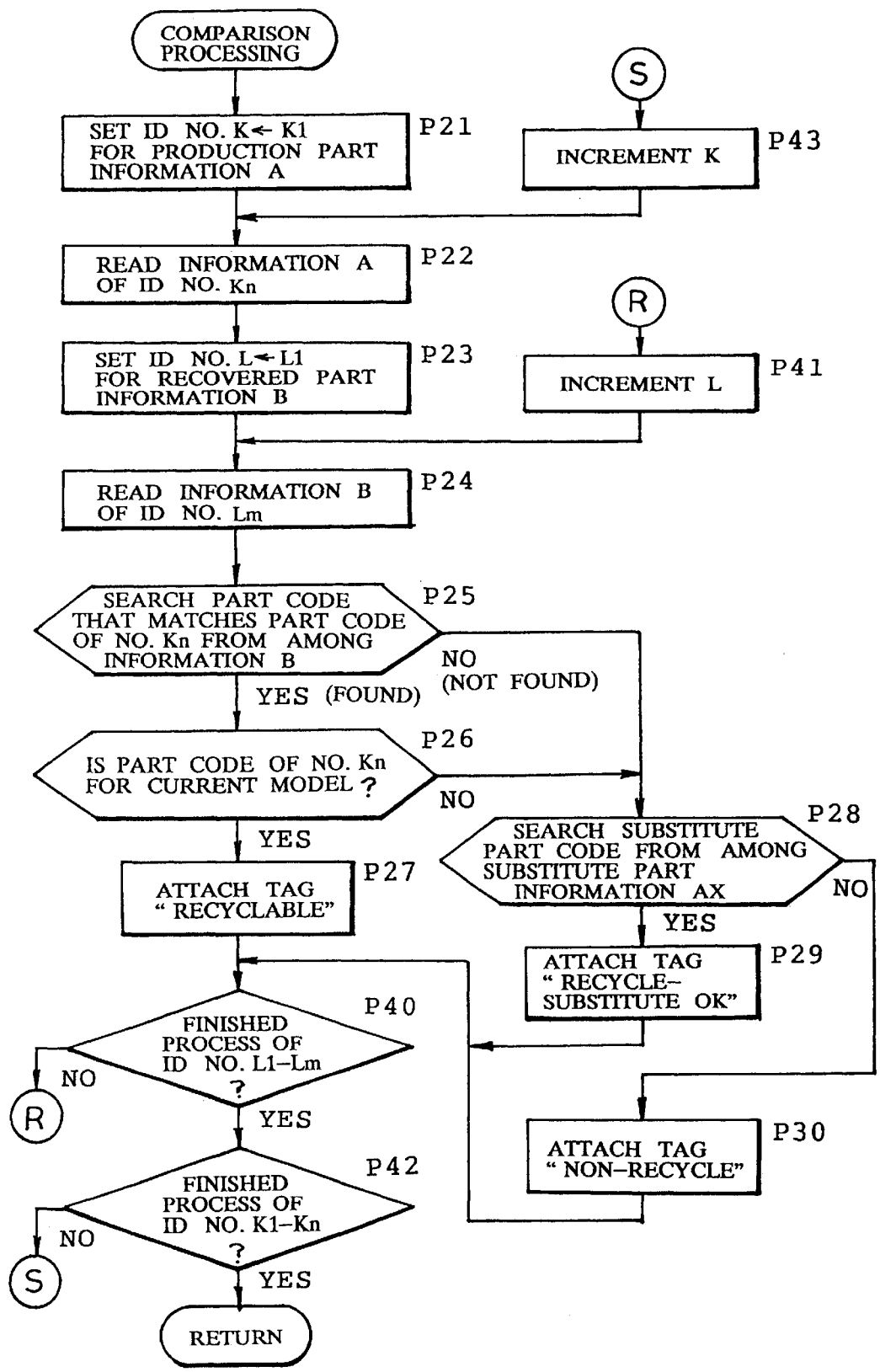
FIG. 4 is a flowchart showing in detail the process for comparing recovered part information B with production part information A.

The flowchart of FIG. 4 illustrates in detail the comparison of the production part information A with the recovered part information B shown in step P15 in the flowchart of FIG. 3.

A detailed description of the comparison processing is described next. The production part information A has n pieces, and an identification number (ID No.) K (K=K1 to Kn) is assigned to these pieces. The recovered part information B has m pieces and the identification number (ID No.) L (L=L1 to Lm) is assigned to these pieces.

First, the identification No. K for production part information A is set as K1, (step P21), and the production part information A of identification No. k is read (step P22). The identification number L of the recovered part information B is set as L1 (step P23), and the recovered part information B of identification No. L is read (step P24).

Search is made for a part code that matches a part code of identification No. K in production part information A from among the recovered part information B (step P25). In the search results of step P25, when an identification No. L of recovered part information B was found to match identification No. K of production part information A, a check is made whether a part code of identification No. K of production part information A is part code for a model currently in production (step P26), if the check shows the part code is for a model currently in production, then a "RECYCLABLE" tag is attached to identification No. Ln of recovered part information B (step P27), and the process proceeds to step P40.

If the search results of step P25 show no matching part code in the recovered part information B that matches a part code of identification No. K of production part information A, and the results of the check in step P26 do not show part code for a model currently in production, then a search is made for a substitute part code that matches the production part information A part code from among the substitute part information AX (step P28), and if a match is found in the substitute part information AX, a "RECYCLE- SUBSTITUTE OK" tag is attached to the identification No. L of recovered part information B (step P29), and the process shifts to step P40. When results of the check in step P28 show that no match is found in the substitute part information AX, a "NON RECYCLABLE" tag is attached to the identification No. Ln of recovered part information B (step P30) and the process shifts to step P40.

In step P40, a check is made if processing for all recovered part information B identification number L1–Lm is complete, and if processing is not complete, the identification No. L of recovered part information B is incremented by "1" (step P41) and the process returns to step P24.

If the check made in step P40 shows that processing is complete for all recovered part information B identification number L1–Lm, then a check is made if the processing for all identification No. K1–Kn of production part information A is complete (step P42), and if processing is not complete, the identification No. K is incremented by "1" (step P43) and the process returns to step P22. If results of the check in step P42 show that processing is complete, then the operation returns to the main routine.

Figure 5:
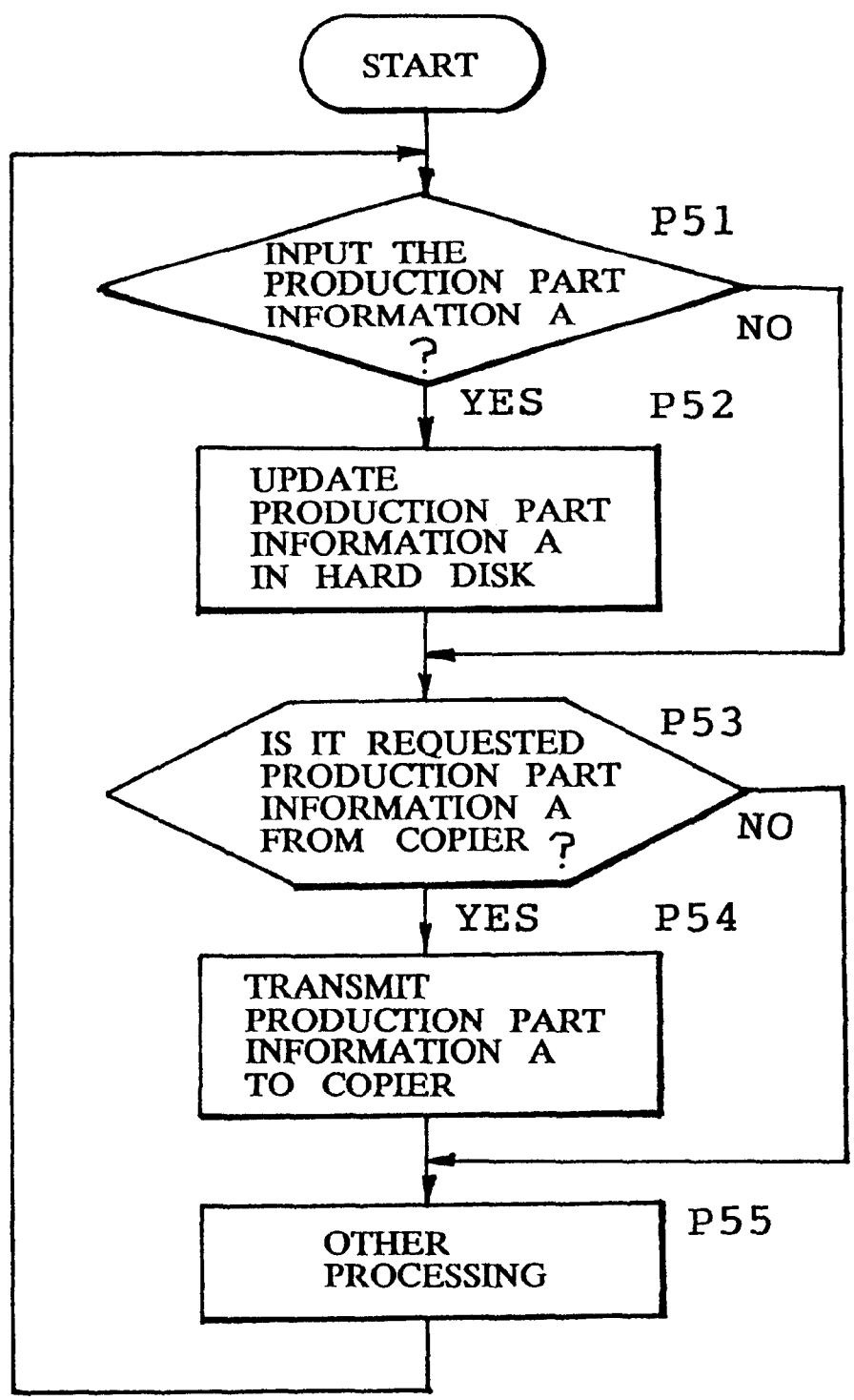
FIG. 5 is a flowchart showing the control operation implemented by the CPU of the production control computer of the manufacturing plant.

FIG. 5 is a flowchart for describing the control operation implemented by the CPU 121 of the production control computer 120 of the manufacturing plant.

First of all, a check is made for input of production part information A such as from personal computers not shown in the drawing in order to update the production part information A (step P51). If information has been input then the production part information A stored in the hard disk 124 is updated (step P52), and if information has not been input, then step P52 is omitted.

A check is made to find if a production part information A transmit request signal has been input from the copier (step P53), and when information has been input, the production part information A used in a plurality of copier models currently in production is sent from the hard disk 124 to the copier 150 by way of the communication line (step P54). When there was no input of a transmit request signal, step P54 is omitted.

Other preset production processing is implemented (step P55) and the process returns to step P51 for the next processing.

FIG. 6 shows a typical recording format for recovered part information B relating to component parts of the copier and stored in the hard disk 155 inside the copier 150. Information showing the model code (EA350) of the copier, and part names, record of parts replacement, parts codes at the time of initial manufacturing as well as parts codes at the time of recovering of the copier is stored in the sequence of identification No. L1–Lm. In other words, when the part has not been substituted during usage period, or when substituted with a part identical to the part at the time of initial manufacturing; then that same parts code is recorded as a parts code at the time of recovering on the hard disk during the copier. When the part has been substituted with a substitute part, then the substitute part code is recorded as the parts code at the time of recovering on the hard disk of the copier.

The operation for recording the substitute part code on the hard disk 155 is performed via the operating panel 158 when the serviceman is making inspections or repairs on the copier, or is performed by connecting a personal computer to the copier control circuit 151 of the CPU 152.

FIG. 7 is a list showing a typical recording format for production part information A used in a plurality of copier models currently in production at the manufacturing plant and stored in the hard disk 124 of the manufacturing plant production control computer 120. When the model code (EA320, EA350, etc.) showing a plurality of copier models in the identification No. (K01–Kn) sequence, and listings of the production status of those models (in production or finished production), parts names and parts codes used in those models, as well as parts capable of substitution are present, then the substitute part code is recorded as substitute parts code information AX.

This production part information A and substitute parts code information AX are constantly updated. The rewriting of the information may be performed directly via the keyboard 126 of the production control computer 120 or may be updated by accessing the production control computer 120 from a plurality of personal computers 170 connected to the communications line 110.

FIG. 8 is a typical recording format for the comparison processing results shown in step P15 in the flowchart of FIG. 3. A recycle tag is attached to and recorded on the recovered part information B on the recording format shown in FIG. 6. The recording shown in FIG. 8 is referred to here as "Recycle Information". The recycle information on the basis of the results of the comparison processing, along with being recorded on the hard disk 155, is also printed out by the printer 160.

In a brief explanation of the recycle information shown in FIG. 8, based on results comparing the production part information A (see FIG. 7), with the recovered part information B composed of a model code (EA350) showing the copier model and, the part name, the part code at the time of recovering (display of part code at the time of initial manufacturing is omitted) in the sequence of identification No. L1–Lm, the recycle tags, "RECYCLE-SUBSTITUTE OK", "NON RECYCLABLE" or "RECYCLABLE" are recorded as recycle information.

In a brief explanation of the recycle tags, even if the operating panel, front cover and side cover corresponding to identification No. L1–L3 are recyclable as raw material, but a "NON RECYCLABLE" tag is attached if determined the operating panel, front cover and side cover are not reusable as parts.

The scanner of identification No. L4 is attached and recorded with a "RECYCLE-SUBSTITUTE OK" tag when determined to be usable as a part in current production (part code 2111-2332-01) or as a substitute part (part No. 2111-2330-01). The photosensitive drum corresponding to identification No. L5 is attached and recorded with a "RECYCLABLE" tag when determined to be usable as a part in current production (part code 2401-1151-02).

The remaining life of the copier parts can be estimated in terms of copier usage, for example by the total number of copies made by the copier as shown on the total copy counter, and this information is then appended to the recycle information, so that criteria for judging the parts application after recycling can be provided.

Further, appending information involving the part standards allows determining which parts cannot be recycled due to a change in the standards.

In the above structure, when the copier is recovered from the user, and the serviceman operates the recovered part information key 159, the process for comparing the recovered part information B with the production part information A is performed automatically, and the recycle information is printed out.

Afterwards, the recovered copier is then dismantled at a service station or recycle facility near the recovered area, and by comparing the recycle information with the recovered parts, the recovered parts are respectively sorted into items to be shipped to the manufacturing plant, items for storage at the service station for use as repair parts, and items to be discarded.

The usage history record (a substitute part or not) of the part, the remaining service life and other information is clearly known by appending the recycle information, so the appropriate application for the part can be determined.

The applicable models for the part shipped to the manufacturing plant are also clearly known by appending the recycle information so that which manufacturing plant to ship the part to is also clearly known. Shipping the entire recovered copier to a recycle plant is therefore not necessary and recycling costs can be reduced.

Further, the recycle information consisting of comparison results for the copier 150 are sent to the production control computer 120, and the recycle information is checked at the manufacturing plant. As a result, issue of orders for production parts and other supervisory items can be performed before the arrival of the recovered part.

The above description was for a recycle information system for an image forming device however, the recycle information system of the present invention is applicable not only to image forming devices but also of course to all types of other devices such as personal computers, portable data terminals and digital cameras.

In the above description, for a recycle information system of the present embodiment, when a machine is recovered from a user, the recovered part information and the production part information are automatically compared, the comparison results are printed out, so that by comparing with the recycle information when the recovered machine is dismantled at a service station or recycle facility near the region of the recovered machine, the recovered parts can then be respectively sorted into parts to be shipped to the manufacturing plant, parts to be stored as replacement parts for making repairs at the service station, and parts to be discarded. Even the destination address to which the parts are to be shipped can be determined. The need to ship the entire recovered machine to the recycle plant is therefore eliminated and a drastic reduction can be made in the recycling expenses.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A recycle information system comprising:
    a first device having first storage means in a control station for storing production part information for parts currently in use or scheduled for use by a manufacturing plant and maintenance service, and first information processing means capable of sending information over a communication line, and
    a second device having second storage means for storing recovered part information for parts to be recovered from a machine for recycling, information transfer instruction means for requesting a transfer of said production part information from the control station, comparison means for comparing said recovered part information with said production part information, and second information processing means for sending information over a communication line,
    wherein said first device and said second device are connected by a communication line, and said recovered part information and said production part information are mutually exchanged between said first device and said second device.

2. A recycle information system according to claim 1, wherein when said information transfer instruction means is operated, said second device requests the sending of said production part information to said first device, and when said production part information is received, the received said production part information is compared with the recovered part information stored in said second storage means, and information showing the comparison results is appended to said recovered part information.

3. A recycle information system according to claim 2, wherein said first device comprises an information input means for constantly updating said production part information stored in said first storage means.

4. A recycle information system according to claim 2, wherein an information showing said comparison results is contained on a tag showing said recovered part is capable of being reused, as well as a tag showing said recovered part is not capable of being reused.

5. A recycle information system according to claim 2, wherein said second device contains an image forming apparatus.

6. A recycle information system according to claim 5, wherein said image forming apparatus prints comparison results from said comparison means onto a recording medium by utilizing an image forming means in said image forming apparatus.

7. A recycle information system comprising:
    a first device having first memory device for storing a first part information showing parts in use or parts scheduled for use by a manufacturing plant or maintenance service, and transmission device for sending a first part information by way of a communication line, and
    a second device having second memory device for storing second part information showing parts used in said second device, receiving device for receiving said first part information from said first device, and comparison device for comparing said first part information and said second part information,
    wherein information can be transferred between said first device and said second device over a communications line.

8. A recycle information system according to claim 7, wherein said second device includes a command device for commanding receiving of said first part information by user operation.

9. A recycle information system according to claim 8, wherein said receiving device requests the sending of said first part information to said first device when commanded by said command device.

10. A recycle information system according to claim 7, wherein said second device appends the comparison results from said comparison device to a second part information stored in said second memory device.

11. A recycle information system according to claim 7, wherein said first device updates first part information based on externally input information.

12. A recycle information system according to claim 7, wherein said comparison device determines whether or not each recovered part is reusable.

13. A recycle information system according to claim 7, wherein said second device further comprises an image forming apparatus.

14. A recycle information system according to claim 13, wherein said image forming device prints the comparison results from said comparison device on a recording medium.

15. An image forming apparatus connected by way of a communication line to a control device storing a first part information showing parts in use or parts scheduled for use by a manufacturing plant or maintenance service, comprising:
- a memory device for storing a second part information showing parts used in said image forming device,
- a receiving device for receiving a first part information from said control device, and
- a comparison device for comparing said first part information and said second part information.

16. An image forming apparatus according to claim 15, further comprising:
- a command device for commanding the receiving of said first part information by user operation.

17. An image forming apparatus according to claim 16, wherein said receiving device requests said first part information to said first device when commanded by said command device.

18. An image forming apparatus according to claim 15, wherein results of comparison by said comparison device are appended to said second part information stored in said memory device.

19. An image forming apparatus according to claim 15, wherein said comparison device determines whether or not each recovered part is reusable.

20. An image forming apparatus according to claim 15, wherein said image forming apparatus prints the comparison results by said comparison device on a recording medium.

* * * * *